United States Patent
Schulze Wehninck

(10) Patent No.: US 12,065,017 B2
(45) Date of Patent: Aug. 20, 2024

(54) LINING

(71) Applicant: K.L. KASCHIER- UND LAMINIER GMBH, Bad Bentheim-Gildehaus (DE)

(72) Inventor: Rembert Schulze Wehninck, Tutzing (DE)

(73) Assignee: K.L. KASCHIER- UND LAMINIER GMBH, Bad Bentheim-Gildehaus (DE)

( * ) Notice: Subject to any disclaimer, the term of this patent is extended or adjusted under 35 U.S.C. 154(b) by 485 days.

(21) Appl. No.: 17/058,663

(22) PCT Filed: Nov. 27, 2019

(86) PCT No.: PCT/EP2019/082708
§ 371 (c)(1),
(2) Date: Nov. 25, 2020

(87) PCT Pub. No.: WO2020/114851
PCT Pub. Date: Jun. 11, 2020

(65) Prior Publication Data
US 2021/0291627 A1 Sep. 23, 2021

(30) Foreign Application Priority Data
Dec. 7, 2018 (DE) ...................... 10 2018 009 526.7

(51) Int. Cl.
*B60H 1/22* (2006.01)
*B29C 45/14* (2006.01)
(Continued)

(52) U.S. Cl.
CPC ....... *B60H 1/2227* (2019.05); *B29C 45/1418* (2013.01); *B60R 13/02* (2013.01);
(Continued)

(58) Field of Classification Search
CPC ...... B29C 2045/14245; B29C 45/1418; B29C 45/14221; B32B 1/00; B32B 2250/03;
(Continued)

(56) References Cited

U.S. PATENT DOCUMENTS 4,060,710 A * 11/1977 Reuter ..................... H05B 3/00
252/514
2010/0167026 A1 * 7/2010 Hayes ................. B29C 45/1671
428/196

(Continued)

FOREIGN PATENT DOCUMENTS

| CN | 2484715 Y | 4/2002 |
| CN | 102229226 A | 11/2011 |

(Continued)

*Primary Examiner* — Dana Ross
*Assistant Examiner* — Joe E Mills, Jr.
(74) *Attorney, Agent, or Firm* — Norman B. Thot

(57) ABSTRACT

An interior trim of a motor vehicle. The interior trim includes a substrate with an outer side which faces an interior of the motor vehicle, a heating film with an outer surface which faces the interior of the motor vehicle, and a decorative layer. The heating film is attached to the outer surface of the substrate. The decorative layer is attached to the outer surface of the heating film. The heating film has no conducting paths and generates heat through an ohmic resistance of the heating film.

12 Claims, 1 Drawing Sheet

(51) Int. Cl.
*B60R 13/02* (2006.01)
*H05B 3/22* (2006.01)

(52) U.S. Cl.
CPC ...... *H05B 3/22* (2013.01); *B29C 2045/14245* (2013.01); *H05B 2203/009* (2013.01); *H05B 2203/013* (2013.01)

(58) Field of Classification Search
CPC ........ B32B 2260/021; B32B 2260/046; B32B 2262/06; B32B 2262/08; B32B 2307/20; B32B 2307/202; B32B 2307/738; B32B 2451/00; B32B 2457/00; B32B 2605/003; B32B 2605/08; B32B 27/00; B32B 3/30; B32B 5/02; B32B 7/025; B60H 1/2227; B60R 13/02; B60R 13/0243; H05B 2203/009; H05B 2203/013; H05B 3/22; B61D 19/02

See application file for complete search history.

(56) References Cited

U.S. PATENT DOCUMENTS

| | | |
|---|---|---|
| 2010/0215977 A1 | 8/2010 | Pfletschinger et al. |
| 2013/0108844 A1* | 5/2013 | Thalhammer ............ B32B 27/32 |
| | | 428/200 |
| 2015/0158269 A1 | 6/2015 | Kim et al. |
| 2016/0059670 A1 | 3/2016 | Satzger et al. |
| 2016/0144690 A1 | 5/2016 | Wittkowski et al. |
| 2017/0352938 A1 | 12/2017 | Okumura |

FOREIGN PATENT DOCUMENTS

| | | |
|---|---|---|
| CN | 103753758 A | 4/2014 |
| CN | 104691074 A | 6/2015 |
| CN | 105500826 A | 4/2016 |
| CN | 106232318 A | 12/2016 |
| DE | 10 2005 034 085 A1 | 2/2007 |
| DE | 10 2012 105 564 A1 | 1/2014 |
| DE | 10 2014 214 329 A1 | 1/2016 |
| DE | 10 2015 007 885 A1 | 12/2016 |
| WO | WO 01/03927 A1 | 1/2001 |
| WO | WO 2014/202768 A1 | 12/2014 |

* cited by examiner

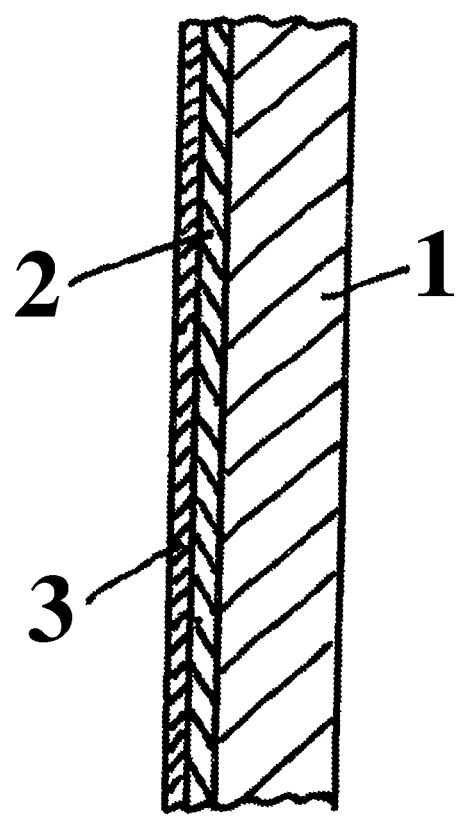

LINING

CROSS REFERENCE TO PRIOR APPLICATIONS

This application is a U.S. National Phase application under 35 U.S.C. § 371 of International Application No. PCT/EP2019/082708, filed on Nov. 27, 2019 and which claims benefit to German Patent Application No. 10 2018 009 526.7, filed on Dec. 7, 2018. The International Application was published in German on Jun. 11, 2020 as WO 2020/114851 A1 under PCT Article 21(2).

FIELD

The present invention relates to an interior trim of a motor vehicle, in particular an interior trim of a motor vehicle door.

BACKGROUND

Equipping the interior trim of a motor vehicle with a heating surface has previously been described. It has thereby become apparent that the engineering structure is elaborate so that production and fitting results in a significant expenditure of time and money.

SUMMARY

An aspect of the present invention is to provide a heatable interior trim of a motor vehicle which is particularly simple in its construction so that production and fitting are simple and inexpensive.

In an embodiment, the present invention provides an interior trim of a motor vehicle. The interior trim includes a substrate comprising an outer side which faces an interior of the motor vehicle, a heating film comprising an outer surface which faces the interior of the motor vehicle, and a decorative layer. The heating film is attached to the outer surface of the substrate. The decorative layer is attached to the outer surface of the heating film. The heating film comprises no conducting paths and generates heat through an ohmic resistance of the heating film.

BRIEF DESCRIPTION OF THE DRAWING

The present invention is described in greater detail below on the basis of embodiments and of the drawings in which:

The FIGURE shows a schematic cross-section of a portion of the interior trim.

DETAILED DESCRIPTION

The present invention provides a substrate which on its outer surface facing the interior of the motor vehicle has a heating film attached to the substrate and by a decorative layer which is in turn attached to the outer surface of the heating film, wherein the heating film does not have any conducting paths and generates its heat through its ohmic resistance.

This results in to a technically simple and inexpensive production and fitting. It is no longer necessary to adhesively bond the heating film, the heating film is instead back injection molded with the substrate.

It is thereby particularly advantageous if the substrate comprises a natural fiber mat. The natural fibers of the fiber mat can be embedded in polypropylene.

A high stability combined with simple production and fitting is achieved if the plastic substrate has reinforcing ribs on the back facing away from the heating film.

A particularly simple process for the production of an interior motor vehicle trim with heating comprises placing, in particular gluing, the heating film into the mold of an injection molding machine and then backing it with the substrate by injecting the substrate into the injection mold (back molding). It is also advantageous if the heating film is molded together with a not yet compacted or only slightly compacted natural fiber mat of the substrate in a press under the effects of pressure and heat.

Embodiments of the present invention are described in greater detail below.

The interior walls of a motor vehicle and the interior sides of the doors of a motor vehicle are equipped with an interior trim that comprises a substrate 1 which is attached, in particular glued, to the interior parts of the motor vehicle walls. The substrate 1 comprises a plastic, in particular a thermoplastic, and has reinforcing ribs on its back.

On the outer surface of the substrate 1 facing the interior of the motor vehicle, a heating film 2 is attached, in particular back molded with the plastic material of the substrate 1, which heating film 2 is subsequently provided with a decorative layer 3 which is sprayed on or glued on. In an embodiment, the substrate 1 can, for example, be a thermoplastic material.

The heating film 2 is inserted, in particular glued, into the mold of an injection molding machine and then back molded with the plastic of the substrate 1.

In an embodiment of the present invention, the substrate 1 can, for example, comprise a natural fiber mat with the natural fibers of the fiber mat being embedded in polypropylene. The heating film 2 is in this case molded together with a not yet or only slightly compacted substrate 1 in a press under the effects of pressure and heat.

It is important that the heating film 2 does not exhibit any conducting paths or structures, but consists of a material that is in itself conductive and that generates heat as a result of its electrical resistance when a voltage is applied.

The substrate 1 with the heating film 2 is then provided with the decorative layer 3, in particular by gluing or by a previous insertion of the decorative layer 3 into the mold of the injection molding machine.

The heating film 2 comprises a plastic film with an electrically conductive coating.

The present invention is not limited to embodiments described herein; reference should be had to the appended claims.

What is claimed is:

1. A process for the production of an interior trim of a motor vehicle, the interior trim comprising:
   a substrate comprising an outer side which faces an interior of the motor vehicle;
   a heating film comprising an outer surface which faces the interior of the motor vehicle, the heating film being attached to the outer surface of the substrate; and
   a decorative layer which is attached to the outer surface of the heating film,
   wherein,
   the heating film comprises no conducting paths but consists of a material that is self-conducting and generates heat through an ohmic resistance of the heating film when a voltage is applied,
   the process comprising:
   inserting the heating film into a mold of an injection molding machine;

back injection molding the substrate as a plastic substrate onto a first side of the heating film; and spraying or gluing the decorative layer onto a second side of the heating film.

2. The process as recited in claim 1, wherein the interior trim is of a motor vehicle door.

3. The process as recited in claim 1, wherein the substrate comprises a natural fiber mat.

4. The process as recited in claim 3, wherein, the natural fiber mat comprises natural fibers, and the natural fibers of the fiber mat are embedded in polypropylene.

5. A process for the production of an interior trim of a motor vehicle, the interior trim comprising:

a substrate comprising an outer side which faces an interior of the motor vehicle;

a heating film comprising an outer surface which faces the interior of the motor vehicle, the heating film being attached to the outer surface of the substrate; and a decorative layer which is attached to the outer surface of the heating film, wherein, the heating film comprises no conducting paths but consists of a material that is self-conducting and generates heat through an ohmic resistance of the heating film when a voltage is applied, the process comprising:

inserting the decorative layer and the heating film into a mold of an injection molding machine; and back injection molding the substrate as a plastic substrate onto a heating film side of the heating film.

6. A process for the production of an interior trim of a motor vehicle, the interior trim comprising:

a substrate comprising an outer side which faces an interior of the motor vehicle;

a heating film comprising an outer surface which faces the interior of the motor vehicle, the heating film being attached to the outer surface of the substrate; and a decorative layer which is attached to the outer surface of the heating film, wherein, the heating film comprises no conducting paths but consists of a material that is self-conducting and generates heat through an ohmic resistance of the heating film when a voltage is applied, the process comprising:

providing the substrate as an uncompacted natural fiber mate or as a substantially uncompacted natural fiber mat;

inserting the substrate and the heating film into a press;

molding the substrate and the heating film together in the press via pressure and heat; and spraying or gluing the decorative layer onto a heating film side of the substrate and the heating film which have been molded together.

7. The process as recited in claim 6, wherein the interior trim is of a motor vehicle door.

8. The process as recited in claim 6, wherein the substrate comprises a natural fiber mat.

9. The process as recited in claim 8, wherein, the natural fiber mat comprises natural fibers, and the natural fibers of the fiber mat are embedded in polypropylene.

10. The process as recited in claim 5, wherein the interior trim is of a motor vehicle door.

11. The process as recited in claim 5, wherein the substrate comprises a natural fiber mat.

12. The process as recited in claim 11, wherein, the natural fiber mat comprises natural fibers, and the natural fibers of the fiber mat are embedded in polypropylene.

* * * * *